United States Patent [19]

Banin

[11] 3,725,528

[45] Apr. 3, 1973

[54] QUANTITATIVE ION EXCHANGE PROCESS FOR CLAY

[75] Inventor: Amos Banin, Rehovot, Israel

[73] Assignee: Yissum Research Development Company of the Hebrew University of Jerusalem

[22] Filed: Feb. 18, 1971

[21] Appl. No.: 116,640

[52] U.S. Cl. .................423/112, 423/118, 423/328, 260/448 C
[51] Int. Cl. ............................................C01b 33/28
[58] Field of Search ....23/111, 112, 113, 1; 252/450; 260/448 C; 106/72; 423/328, 112, 118

[56] References Cited

UNITED STATES PATENTS

| | | | |
|---|---|---|---|
| 3,012,050 | 12/1961 | Fox et al. | 260/448 C |
| 2,951,087 | 8/1960 | Hauser et al. | 260/448 C |
| 3,201,197 | 8/1965 | Showalter | 23/112 |

OTHER PUBLICATIONS

Carlson et al., "Soil Science" Vol. 103, 1967, pages 213–218
Tabikh et al., "Soil Science" Vol. 90, 1960, pages 219–226
Barshad "Soil Science" Vol. 108, 1969, pages 38–42
Kunin "Ion Exchange Resins" copyright 1950 by John Wiley & Sons, Inc. pages 55–60, 89, 93, 94, 112, 113, 151, 160, 293, 306, 307, & 389
Banin "Israel Journal of Chemistry" Vol. 6, 1968 pages 27–36
Banin et al., (I) "Israel Journal of Chemistry" Vol. 6, 1968 pages 235–250
Banin et al., (II) "Nature" Vol. 217, Mar. 23, 1968 pages 1146–1147

*Primary Examiner*—Edward J. Meros
*Attorney*—Chittick, Pfund, Birch, Samuels & Gauthier

[57] ABSTRACT

A quantitative ion exchange process for preparing modified clay is disclosed. Clay such as montmorillonite is converted (1) to an acid-free hydrogen-clay by use of an anion (hydroxide) exchange resin; or (2) to another cationic form such as lithium-clay by use of an anion (hydroxide) exchange resin and an equivalent amount of the exchanging cation.

16 Claims, No Drawings

QUANTITATIVE ION EXCHANGE PROCESS FOR CLAY

BACKGROUND OF THE INVENTION

This invention relates to a novel process for modifying montmorillonite or similar clays. Montmorillonite (which is the main component of a particular clay often generically referred to as bentonite) has wide commercial use because of its high colloidal, plastic, and binding properties. Example known uses for montmorillonite or similar clays are as drilling muds, catalysts, and color removing agents in the petroleum industry; as bonding clays in foundries; and as adsorbents for oils, pesticides, alkaloids, vitamins and other materials. Montmorillonite or bentonite clays are also used in such products as cosmetics, de-inking agents, enamels, medicinal emulsions, bodying agents and pastes.

Naturally occurring montmorillonite is an alumosilicate with plate-like particles and has a typical structural formula of:

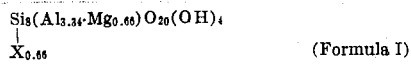

(Formula I)

wherein X is an exchangeable metallic cation such as calcium, magnesium, hydrogen, potassium, or sodium and mixtures thereof, which varies according to the source of the clay. These metals are held or adsorbed by the montmorillonite in an ionic relationship and are readily exchangeable for other cations. This ion exchange property is of fundamental importance in most fields in which this clay material is used. A common commercial material is known as "active clay," "activated clay," or "hydrogen-clay" and is approximately represented by Formula I where X is $H^+$. It is prepared by replacing the exchangeable metallic cations of the clay with hydrogen ions ($H^+$). Another well known and widely-used ionic form of montmorillonite is the Na-form. It is prepared by ion exchanging the natural cations on clay with sodium salts, such as $Na_2CO_3$.

Certain limited techniques are, therefore, known in the prior art for modifying natural montmorillonite by replacing the exchangeable cations with other cations, i.e., changing (X) in the Formula I. In general, however, montmorillonite is used in it natural form or, if modified, the modification technique often does not enable a high degree of control to be exerted over the final ionic composition (X) of the clay. If such control is attempted, an expensive and/or difficult process is frequently required.

Prior art processes for modifying montmorillonite-type clay materials can be found in the following references:

U.S. Pat. No. 3,326,632 discloses the production of certain ion exchange materials from montmorillonite. The process involves treating the clay with an organic compound, heating, acidifying, treating with alkali, and drying.

U.S. Pat. No. 3,148,158 discloses a process for acid activating clay such as montmorillonite by treating the clay with a hydrolyzable inorganic or organic halide. The product is useful as a catalyst.

U.S. Pat. No. 2,951,087 discloses the production of hydrogen-clay by reacting bentonite with HCL or a cation (acid) ion-exchange resin, and subsequent reaction of the clay with a conjugated diolefin such as benzene to form an organophilic clay primarily useful in synthetic rubber.

U.S. Pat. No. 3,287,422 discloses a process for activating clay such as montmorillonite with sulfuric acid.

U.S. Pat. No. 3,228,784 discloses the preparation of a hydrogen modified alumino silicate ion-exchange material which has the ability to remove trace amounts of heavy metals from weak acid solutions.

U.S. Pat. No. 3,201,197 discloses a process for preparing hydrogen-montmorillonite by treating the clay with a dilute mineral acid in an organic solvent.

U.S. Pat. No. 3,158,579 discloses several alternative methods of cation exchanging clay to obtain a modified clay for use as a binder for alumino silicate molecular sieves.

U.S. Pat. No. 3,081,154 discloses a process for preparing silica compounds from ammonium silicate which in turn is prepared by passing sodium silicate through a cation exchange resin.

Further background on modified montmorillonite can be found in the following references:

Banin, A. and Ravikovitch, S., 1965. Kinetics of reactions in the conversion of Na- or Ca-saturated clay to H-Al clay. *Clays and Clay Minerals*, 14, 193–204.

Banin, A., 1967. Tactoid formation in montmorillonite. Effect on ion exchange kinetics. *Science*, 155, 71–72.

Banin, A., 1968. Ion exchange isotherms of montmorillonite and structural factors affecting them. *Israel J. Chem.*, 6, 27–36.

Banin, A., and Lahav, N., 1968. An optical study of particle size of montmorillonite with various adsorbed ions. *Nature*, 217, 1146–1147.

Banin, A., and Lahav, N., 1968. Particle size and optical properties of montmorillonite in suspension. *Israel J. Chem.*, 6, 235–250.

Lahav, N. and Banin, A., 1968. Tactoid rearrangement and the optical density of montmorillonite suspensions during Na-Ca exchange reaction. *J. Colloid and Interface Sci.*, 26, 238–239.

Banin, A., and Shaked, D., Particle size and surface properties of acidic montmorillonite. Proc. 3rd Intl. Cong. AIPEA, Tokyo, Japan, 1969, Vol. I, 669–682.

Carpenter, R. R., and Reisberg, M.A., 1968. Carbodiimide-induced bentonite-antigen complexes: Readily prepared immuno-adsorbents. *J. Immunology*, 100, 873–879.

Bolt, G. H. and Frissel, M. I., 1960. The preparation of clay suspensions with specified ionic compositions by means of exchange resins. *Soil Sci. Soc. Am. Proc.* 24, 172–177.

A reading of the above patents and other references shows that the use of ion exchange resins and certain ion exchange reactions for modifying montmorillonite and similar clay materials are known in the art. Many of the prior art techniques for preparing modified montmorillonite involve the use of a cation exchange resin wherein cations from the resin directly replace cations of the clay. These techniques are generally not quantitative and, unless large excess of exchanging ions are used, provide very little control over the final ionic composition of the modified clay. In contrast, the process of the present invention is characterized by the use of an anion exchange resin to indirectly but quantitatively effect the exchange of cations from simple salts with cations of the clay, using only an exact and the desired amount of each cation to replace the adsorbed cations.

SUMMARY OF THE INVENTION

The present invention provides a novel process wherein controlled and quantitative modification of clay such as montmorillonite is achieved in an inexpensive and relatively simple manner by using an anion exchange resin.

In a first embodiment of the invention, a mixture of hydrogen-clay, e.g., H-montmorillonite, and acid is mixed with an anion exchange resin in the hydroxide state whereby the anion of the acid exchanges with the hydroxide of the resin which in turn neutralizes the hydrogen to produce an acid-free mixture containing the hydrogen-clay.

Thus, the first embodiment of the invention is a process for producing an acid-free hydrogen-clay from a mixture of hydrogen-clay and acid, which comprises: mixing the hydrogen-clay and acid with an anion exchange resin in the hydroxide state.

In a second embodiment of the invention, hydrogen-clay is mixed with an equivalent amount of a salt in the presence of an anionic exchange resin in the hydroxide state whereby the cation of the salt quantitatively replaces the adsorbed hydrogen of the clay while the anion of the salt replaces an equivalent amount of hydroxide from the resin. The replaced hydroxide from the resin combines with the replaced hydrogen from the clay and any other hydrogen ions present in the system to form water. In result, a hydrogen-free, acid-free and salt-free cation-saturated clay is obtained.

Thus, the second embodiment of the invention is a process for producing an acid-free and salt-free cation-clay from hydrogen-clay which comprises mixing the hydrogen-clay with an equivalent amount of a salt in the presence of an anion exchange resin in the hydroxide state.

DETAILS OF THE INVENTION

The starting material for use in the process of the present invention can be any clay or clay-like material.

In general, clays of the halloysite, illite, kaolinite, montmorillonite, palygorskite groups and various unclassified clays can be readily converted to hydrogen-clay or other cation-clays by the process of the invention.

Members of the halloysite group include: allophane, endellite, halloysite, indianite, metahalloysite, schrotterrite, etc.

Example members of the illite group are brammallite, bravaisite, glimmerton, hydromica, sercicite, etc.

Kaolinite is commonly found with other members of the kaolinite group including: anauxite or ionite, collyrite, dickite, ferrikaolinite, nacrite, neokaolin, metakaolin, metanacrite, severite, etc.

The montmorillonite group includes the following: "Amargosite" beidellite, bentonite, chloropal, erinite, ferromontmorillonite, hectorite, metabentonite, montmorillonite, nontronite, otaylite, saponite, etc.

The palygorskite group includes the following clays: attapulgite, calciopalygorskite, lasallite, palygorskite paramontmorillonite, parasepiolite, sepiolite, etc.

Various unclassified clays which can be used are: faratsihite, glacialite, grundite, potash montmorillonite, potash bentonite, ptilolite, sericite, muscovite, etc.

As noted above, any of the aforementioned clay minerals can be converted to acid-free hydrogen-clay or other cation-clay by the process of this invention. Of these clays, those of the montmorillite group are preferred and within the group montmorillite itself is most preferred. This preferred starting material has a typical structural formula corresponding to Formula I, wherein X is an exchangeable metallic cation selected from the group consisting of calcium, magnesium, hydrogen, sodium, potassium and mixtures thereof. Such material is naturally occurring and is in abundant commercial supply throughout the world.

The clay material is first pre-treated with an excess of acid to displace the exchangeable cations of the clay with hydrogen ions and thus to convert it to hydrogen-clay.

Any strong acid can be used for pre-treating the clay such as hydrochloric, sulfuric, nitric or similar strong acids. Of these, hydrochloric acid is preferred.

The acid treating step can be carried out at room temperature, e.g., 20°–30° C., but is preferably carried out at about 5° C. since at high temperatures the clay may tend to decompose in the presence of strong acid.

The acid pre-treatment can be effected by, but is not necessarily restricted to, known processes such as are employed in the manufacture of decolorizing clays. Normally, the acid treatment is carried out by adding mineral acid such as hydrochloric acid or sulfuric acid to the clay while the clay is in finely divided form and suspended in water in the form of a slurry. Alternatively, dilute mineral acid can be added directly to the finely divided clay. Such acid treatments of montmorillonite types of clay are described in U.S. Pat. Nos. 1,397,113, 1,579,326, 1,642,871, 2,470,872, 2,472,489, 2,484,828 and 2,553,239.

An acid strength and amount can be used in the acid treatment to provide preferably a clay-acid mixture having a pH of about 1. Preferably, the acid treatment is carried out in several stages where each stage comprises the steps of adding the acid to the clay in a ratio of 1:3 – 1:7 w/w clay to solution, mixing or agitating, e.g., for 5 to 60 minutes, to form a suspension of clay in acid, and then separating the clay from the acid, e.g., by sedimentation or centrifugation.

Multi-stage treatment involving relatively rapid mixing steps is preferred compared to a single state treatment involving a longer mixing step because the clay can slowly dissolve in the acid over a period of time. On the other hand, it is desirable to dissolve and thus separate from the clay any contaminants which may be present. Accordingly, two to five stages each comprising adding acid to the clay, mixing for 10 to 30 minutes and separating the clay from the acid, is preferred.

At the end of the acid treatment step, all of the exchangeable metallic cations of the clay will have been replaced by hydrogen ions, i.e., a saturated hydrogen-clay will be obtained. However, free acid will also be associated with the hydrogen-clay due to the acid treatment.

Conventionally, in the production of activated or hydrogen-clay, the free acid just described is separated from the hydrogen-clay by tedius leaching or water washing procedures. It is not uncommon for five to six leaching steps to be required in order to obtain saturated hydrogen-clay uncontaminated by free acid.

However, in the process of the present invention, physically leaching, or water washing, the hydrogen-clay is not necessary. Instead, the invention process provides what can be described as a "chemical leaching" step wherein the hydrogen-clay and associated free acid is mixed with an anion exchange resin in the hydroxide state.

Hydrogen-clay separated in the last stage of the acid treatment step and its associated free acid is added to water to form a mixture of hydrogen-clay and acid which mixture comprises the starting material in the invention chemical leaching step. Alternatively, the hydrogen-clay and acid mixture obtained in the last stage of the acid treatment step prior to separation, can comprise the starting material in the invention chemical leaching step. In either case, the acid mixture preferably has a pH of 1 to 4, most preferably 1.5 to 2.9.

In the chemical leaching step an anion exchange resin in the hydroxide state is mixed with the hydrogen-clay and acid mixture. The resin can be added directly to the mixture to form a slurry or the resin can be placed in a basket which in turn is swirled or rotated through the mixture. When the resin contacts the mixture, it interacts with the hydrogen-clay and the free acid.

The anion of the free acid, e.g., Cl⁻ if hydrochloric acid was used in the acid pre-treatment step, ion-exchanges with the hydroxide of the resin while the released hydroxide reacts with the free hydrogen in the solution to form water.

This chemical leaching step, which is very rapid compared to convention leaching techniques, can be schematically represented in Equations (1) and (2) as follows

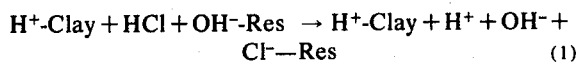

$$H^+\text{-Clay} + HCl + OH^-\text{-Res} \rightarrow H^+\text{-Clay} + H^+ + OH^- + Cl^-\text{—Res} \quad (1)$$

$$H^+ + OH^- = H_2O \quad (2)$$

where:
H⁺-Clay = Hydrogen Clay
OH⁻-Res = Anion exchange resin in hydroxide state In the first embodiment of the invention, the above ion-exchange reaction is allowed to go to completion, e.g., in 10 to 30 minutes, so that an acid-free hydrogen-clay product is obtained which can then be separated and dried.

In the second embodiment of the invention, where it is desired to prepare a cation-clay other than hydrogen-clay, an equivalent amount of a salt is mixed with the hydrogen-clay mixture while in the presence of the resin. Preferably, the salt is added at a point in the chemical leaching operation when the pH of the system is from about 3 to 3.5 which corresponds to an electrical conductivity of about 100 to 200 micro mho/cm.

It is important that an equivalent amount of salt be added. By "equivalent amount" is meant an amount of salt which is equivalent to the total exchange capacity of the clay in the system and/or the quantity of hydrogen in the system, whichever is smaller.

When the salt is added to the system, the cations of the salt ion-exchange with the adsorbed hydrogen ions of the hydrogen clay while the anions of the salt release hydroxide from the resin. Usually the final ionic distribution in each of these reactions depends on the selectivity coefficient of the exchanger; however, in the present system, the released hydrogen ions and hydroxide ions combined to form water. This drives the ion exchange reactions to quantitative completion. These reactions can be schematically represented in Equations (3), (4) and (5), for example, when the salt added is lithium chloride and the cation-clay product is lithium-clay:

$$H^+\text{-Clay} + Li^+ \leftrightarrows Li^+\text{-Clay} + H^+ \quad (3)$$

$$OH^-\text{-Res} + Cl^+ \leftrightarrows Cl^-\text{-Res} + OH^- \quad (4)$$

$$H^+ + OH^- = H_2O \quad (5)$$

If free acid is still present in the system when the salt is added, it will continue to ion-exchange with the resin as described above in the first embodiment and the overall reaction can be schematically represented as in Equation (6):

$$H^+\text{-Clay} + HCl + LiCl + OH^-\text{-Res} \rightarrow Li^+\text{-Clay} + Cl^-\text{-Res} + H_2O \quad (6)$$

When the reaction is completed, which normally takes from about 5 to 60 minutes, preferably 10 to 30 minutes, after the salt is added, the system has a pH of about 5.5 to 7.5, preferably 6 to 7. At this point, the cation of the salt has completely and quantitatively replaced the adsorbed hydrogen of the hydrogen-clay and a hydrogen-free, acid-free, salt-free cation-saturated clay is obtained. This cation-clay can be used as such a suspension or, alternatively, can then be separated from the system and dried by conventional methods, e.g., by forced air, or by centrifugation or sedimentation and then freeze-drying the resulting paste.

The resin can also be separated from the system, e.g., by filtration, and can be reused after regeneration.

A wide variety of anion exchange resins are commercially available and can be used in effecting the process of the present invention. Preferred are the strongly basic anion exchange resins which contain quaternary ammonium active groups on a cross-linked polystyrene-divinylbenzene matrix. Examples of such commercial materials are the "Amberlites" (Rohm & Haas) such as IRA-400, IRA-401, and IRA-410, "Dowex 1-28" (Dow), and "De-Acidite FFIP" (Permutit). Other equivalent materials having strongly basic anion exchange capacity can also be used. For further reference in selecting anion exchange materials for use herein, see F. Helfferich's text *Ion Exchange*, McGraw-Hill, New York, 1962.

When preparing cation-clays in the second embodiment of the invention, the cation can be any desired cation or mixtures of cations including organic cations. Thus, the cation can be a monovalent metal such as sodium, potassium, lithium, cesium, ammonium or rubidium, a divalent metal such as magnesium, barium, calcium, zinc, copper, manganese, cobalt, nickel and the like, a trivalent metal such as iron (ferric), chromium and aluminum, an organic cation such as methyl ammonium or mixtures of any of the above.

The cation in the cation-clay product corresponds to the cation of the added salt. For example, if lithium is the desired cation then a lithium salt is added to the hydrogen-clay system in the presence of the anion exchange resin. The salt can be any salt of lithium (or other desired cation) which is soluble in water or other polar liquid used in the system. Thus, chloride, bromide, sulfate, sulfite, acetate, phosphate, nitrate, or other salts can be used. Of these, chloride salts are preferred because of their solubility and availability.

The invention process provides numerous advantages in the production of hydrogen-clay or other cation-clays as compared to known processes for obtaining such modified clays. Among these advantages are:

1. Only stochiometric amount of salts are necessary to convert the clay, and not the large excess used conventionally. This is especially important when the salts needed are relatively expensive such as Li-salts or those containing organic cations.

2. The final ionic composition is easily controlled in a multi-ionic system, a condition not easily obtained by conventional methods.

3. The conventional type of leaching is omitted. This shortens and simplifies the procedure.

4. The process is easily changed to yield different end products; simply by changing the type of salt that is added — in the last stage of the process — different products are obtained.

5. The resulting modified clay material has numerous applications, e.g., as an absorbent, and its ionic composition can easily be "tailored" to fit various uses.

In regard to the physical properties of the modified clay end-product, it is to be noted that:

1. The clay can be used while still in suspension, or in the form of a homogeneous thick paste, or as a fine dry powder.

2. The effective external surface area can be controlled and varied between wide limits, e.g., 100 to 800 $m^2/gr$.

3. The average size of the clay particles can be controlled and varied between the limits of 1–15 platelets per particle.

4. The viscosity and other rehological properties of the clay can be controlled.

5. Thermal, electrical and other physical properties will generally be as typical to natural montmorillonite clay.

6. Biological properties will generally be as typical to natural montmorillonite clay.

Compared to natural clay such as montmorillonite, the modified clay has:

1. Known and defined ionic composition;
2. Known and defined particle size distribution;
3. Known and defined specific surface area.

The modified clay obtained by the process of this invention can be used in diverse ways. First, it can be used with advantage in all conventional uses of clays such as montmorillonite. Moreover, because of the ability to tailor the final ionic composition of the clay by the herein disclosed quantitative ion exchange process, new applications for clay are now possible. These applications are as follows:

1. The modified clay can be used as a matrix material for desalination and other charged membranes. As a charged material montmorillonite in the form of single platelets can be incorporated in membranes to produce effective "barriers" for salts. Being an inorganic material it is not susceptible to attacks by microorganisms as are most of the materials used presently in desalination membranes. It also has a high surface charge density and therefore a large rejection ratio for ions. Since the packet size and ionic form can be easily controlled by the quantitative ion-exchange process of this invention, the production of such membranes is now possible.

2. The modified clay can be used as a high temperature binding agent. Binding components into systems that have to withstand high temperatures is met with difficulties when the bond has to be electrically non-conducting such as in some electronic systems and the like. Organic binders as well as metals cannot be used, the first group because of their instability at high temperature and the second because of their high electrical conductivity. Thus, the modified clay obtained by the present process, e.g., lithium-clay or cesium clay, can act as such a binder when it is used due to an irreversible collapse and mutual adherence of the platelets that takes place at an elevated temperature (400°–600° C.) in this material.

3. The modified clay can be used as an immuno-adsorbent. Montmorillonite has been reported to act as an efficient immuno-adsorbent when adsorbed with certain carbodiimides. (See *J. Immunology*, 100, 873). The procedure enables the isolation of small amounts of antibody by binding them to the antigen treated montmorillonite. Thus, the production of carbodiimide-montmorillonite by the efficient methods of the present invention may open the way to widespread utilization of this adsorbent in biological research and in medicine.

4. The clay modified with trace elements can be used as nutritive source for animals and for plants. The supply of essential trace elements to living organisms in the right amount, proportion and rate is becoming more and more the limiting factor for efficient organism development and productivity. Direct application of the trace elements to plants is frequently met with difficulties due to fixation, leaching and other processes that reduce the availability of the elements to the organism. Therefore it is customary to add these elements in the form of chelates, i.e., stable, soluble organic compounds. Though the supply by means of the chelates is usually successful, there are some drawbacks, partly because of their toxicity to some plants due to accumulation in the tissues, and mainly due to the very high cost of the materials. These disadvantages can be overcome by applying the cationic micro elements in adsorbed form inside the montmorillonite packets, i.e., prepared by the process of this invention. In this form a predetermined proportion of the various elements can be administered and their release is slowed down by the interdiffusion of the ions inside the packet. By changing the number of platelets in a packet and its size, the release rate can be changed to obtain the optimal supply conditions for the organisms' development. The carrier (montmorillonite) is inert, nontoxic and a very economical material. Thus, great reduction in cost and increased effectiveness can be achieved.

EXAMPLE 1

Preparation of Lithium-clay

Crude montmorillonite (Wyoming bentonite) clay containing 35 and 47 meg/100 gr, respectively, of exchangeable $Na^+$ and ($Ca^{++}$ + $Mg^{++}$), and 25 meg/100 gr soluble salts was first converted to the hydrogen state as follows:

The clay was suspended in 0.5 N HCl (technical grade) solution in a ratio of 1:5 w/w clay to solution to provide a slurry. The slurry was then agitated at room temperature for 20 minutes. The clay was sedimented by centrifugation at 1,000 RCF for 10 minutes. Acid solution was discarded and clay was resuspended in the fresh acid solution at the same clay-to-solution ratio. The slurry was agitated overnight and then centrifuged as above. The clay was again resuspended in acid, agitated for 20 minutes and centrifuged for 20 minutes at 2,000 RCF. The hydrogen-clay sediment was then homogenized and kept at 4° C. for further use.

A 1.2% w/w hydrogen-clay suspension in deionized water was prepared by adding the homogenized hydrogen-clay prepared as above to deionized water. The pH of the suspension was 1.5 and the electrical conductivity of the suspension was 3.6 milli mho/cm. The hydrogen concentration in the suspension was estimated to be 25 meg/L.

45 ml of wet, OH-saturated, anion exchange resin containing quaternary ammonium active groups on a cross-linked polystyrene-divinylbenzene matrix (Rohm and Haas IRA-410) in the particle size range of 20–50 mesh, was added per liter of suspension to give a ratio of $\approx 1:1.5$ of $H^+$ to $OH^-$ in the system. The resin beads were enclosed in a mesh basket that was stirred in the suspension. Electrical conductivity of the suspension was continuously monitored and recorded. When the conductivity reached a value of 150 micro mho/cm, which took 15 minutes, 400 mg. of LiCl salt were added per each liter of suspension as the 1 N solution. The total amount of added LiCl was equivalent to the cation exchange capacity of the hydrogen-clay in the system. Upon addition of the LiCl, an exchange reaction took place as illustrated in Equation (7):

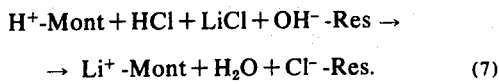

$$H^+\text{-Mont} + HCl + LiCl + OH^-\text{-Res} \rightarrow$$
$$\rightarrow Li^+\text{-Mont} + H_2O + Cl^-\text{-Res.} \qquad (7)$$

[Where:
Mont = montmorillonite
Res = anion exchange resin]

When the reaction was completed in 30 minutes as shown by no further change in electrical conductivity and/or pH of the suspension, the resin basket was taken out of the suspension.

The Lithium-clay was then dried by forcing air at 40° C. above it. Equivalent results can be obtained when the clay is dried by centrifugation and freeze-drying of the paste.

The Lithium-clay obtained had the following properties:

| | |
|---|---|
| Electrical conductivity | 33.4 micro mho/cm, 25° C. |
| pH: Fresh suspension | 7.4 |
| After 15 days | 5.9 |
| Average relative tactoid size | 1.1 – 1.2 plates |
| Effective external surface area | 620–680 m²/g clay |
| Exchangeable Li content | 5.6 mg/gr clay |
| or | 80 meq Li⁺/100 gr clay |

EXAMPLE 2

Preparation of Sodium-Saturated Clay

The same procedure of Example 1 was carried out with the exception that 580 mg NaCl were added per 1 liter of the hydrogen-clay suspension as a 1N solution of NaCl, and the quantitative exchange reaction took place between $H^+$ and $Na^+$.

The sodium-clay obtained had the following properties:

| | |
|---|---|
| Electrical conductivity | 29.3 micro mho/cm, 25° C. |
| pH: Fresh suspension | 7.2 |
| After 15 days | 6.4 |
| Average relative tactoid size | 1.4 plates |
| Effective external surface area | 520 m²/g clay |
| Exchangeable Na content | 19.3 mg/gr clay |
| or | 83 meq Na⁺/100 gr clay |

EXAMPLE 3

Preparation of Calcium-Saturated Clay

The procedure described in Example 1 was carried out with the exceptions that a hydrogen-clay suspension containing 12.0 gr clay/liter was prepared and 540 mg $CaCl_2$ were added as the 1N $CaCl_2$ solution.

The Calcium-clay obtained had the following properties:

| | |
|---|---|
| Electrical conductivity | 28.3 micro mho/cm, 25° C. |
| pH: Fresh suspension | 7.0 |
| After 15 days | 6.2 |
| Average relative tactoid size | 2.4 – 2.5 plates |
| Effective external surface area | 300 – 315 m²/g clay |
| Exchangeable Ca content | 16.1 mg/gr clay |
| or | 81 meq Ca⁺⁺/100 gr clay |

EXAMPLE 4

Preparation of Zinc-Saturated Clay

The procedure described in Example 1 was carried out with the exceptions that a hydrogen-clay suspension containing 13.1 gr clay/liter was prepared and 650 mg $ZnCl_2$ were added as the 1N $ZnCl_2$ solution.

The zinc-clay obtained had the following properties:

| | |
|---|---|
| Electrical conductivity | 64.2 micro mho/cm, 25°C. |
| pH: Fresh suspension | 6.9 |
| After 15 days | 4.2 |
| Average relative tactoid size | 2.7 – 2.8 plates |
| Effective external surface area | 250 – 270 m²/g clay |
| Exchangeable Zn content | 23.7 mg/gr clay |
| or | 72.9 meq Zn⁺⁺/100 gr clay |

EXAMPLE 5

Preparation of Copper-Saturated Clay

The procedure described in Example 1 was carried out with the exceptions that a hydrogen-clay suspension containing 11.4 gr clay/liter was prepared and 490 mg $CuCl_2$ were added as the 1N $CuCl_2$ solution.

The copper-clay obtained had the following properties:

| | |
|---|---|
| Electrical conductivity | 28.6 micro mho/cm, 25° C. |
| pH: Fresh suspension | 7.0 |
| After 15 days | 4.2 |
| Average relative tactoid size | 2.6 – 2.7 plates |
| Effective external surface area | 280 – 290 m²/g clay |
| Exchangeable Cu content or | 20.0 mg/gr clay 63.0 meq Ca$^{++}$/100 gr clay |

EXAMPLE 6

Preparation of Cobalt-Saturated Clay

The procedure described in Example 1 was carried out with the exceptions that a hydrogen-clay suspension containing 9.6 gr/liter was prepared and 420 mg CoCl$_2$ were added as the 1N CoCl$_2$ solution.

The cobalt-clay obtained had the following properties:

| | |
|---|---|
| Electrical conductivity | 23.2 micro mho/cm, 25° C. |
| pH: Fresh suspension | 5.0 |
| After 15 days | 7.1 |
| Average relative tactoid size | 2.2 – 2.3 plates |
| Effective external surface area | 320 – 340 m²/g clay |
| Exchangeable Co content or | 19.9 mg/gr clay 68 meq Co$^{++}$/100 gr clay |

EXAMPLE 7

Preparation of Iron-Saturated Clay

The procedure described in Example 1 was carried out with the exceptions that a hydrogen-clay suspension containing 7.8 gr clay/liter was prepared and 360 mg FeCl$_3$ were added as the 1N FeCl$_3$ solution.

The iron-clay obtained had the following properties:

| | |
|---|---|
| Electrical conductivity | 18.9 micro mho/cm, 25° C. |
| pH: Fresh suspension | |
| After 15 days | 4.3 |
| Average relative tactoid size | 2.8 plates |
| Effective external surface area | 250 – 270 m²/g clay |
| Exchangeable and replaceable Fe content or | 15.7 mg/gr clay 84 meq Fe$^{++}$/100 gr clay |
| of which: Exchaneable in 1N CaCl$_2$: 20 meq/100 gr clay Replaceable in 0.5N HCl 64 meq/100 gr clay | |

EXAMPLE 8

Preparation of Methyl-Ammonium Saturated Clay

The procedure described in Example 1 was carried out with the following modifications: After conversion to the hydrogen form, a suspension containing 12.5 gr clay/liter was prepared; the OH-resin contained in a basket was stirred in the suspension and a 1N solution of methyl-ammonium chloride was added from a syringe pump at a constant rate. The pH was constantly measured and recorded and the addition of the salt solution was terminated when the pH reached the value of 7.0.

The methyl-ammonium - clay obtained had the following properties:

| | |
|---|---|
| Electrical conductivity | 42.0 micro mho/cm, 25° C. |
| pH: Fresh suspension | 7.0 |
| After 15 days | 5.4 |
| Exchangeable methyl-ammonium content or | 25.0 mg/gr clay 78 meq (CH$_3$NH$_3$)$^+$/100 gr clay |

EXAMPLE 9

Preparation of Hydrogen-Saturated Clay (Montmorillonite Type)

Hydrogen-saturated montmorillonite (active clay) was prepared as follows: First, a suspension of 8 gr/l of hydrogen-clay, containing free acid, was prepared and the procedure described in Example 1 was followed up to the stage where the OH-saturated resin was added. Then the resin was stirred in the suspension for 15 minutes, and separated from it. The electrical conductivity had then dropped to 2.0 micro mho/cm. The pH of the suspension was 3.9. The fresh hydrogen-clay contained as exchangeable ions — 61 meq H$^+$/100 gr and 10 meq Al$^{+3}$/100 gr clay as determined by a pH-metric titration with NaOH.

EXAMPLE 10

Preparation of Hydrogen-Saturated Clay (Illite Type)

Hydrogen-saturated illite clay was prepared by generally following the procedure described in Examples 1 and 9 with the exceptions that an illite from Fithian, Illinois, was leached with hydrochloric acid, and carried through all the procedure described in said examples.

The resulting fresh hydrogen-illite suspension had an electrical conductivity of 10.0 micro mho/cm, and a pH of 4.4. The clay contained as exchangeable ions — 6.3 meq H$^+$/100 gr and 7.2 meq Al$^{+3}$/100 gr, as determined by a pH-metric titration with NaOH.

The following are descriptions and References for the chemical and physico-chemical methods used in analyzing and characterizing the clays in the above Examples as well as a definition of the abbreviations utilized therein.

1. Electrical conductivity: was measured and recorded using a dipping electrode cell and a conductivity transducer connected to a potentiometric recorder. The transducer-recorder system was calibrated using high accuracy resistors.

2. pH: was determined using a combined glass + reference electrode and a pH-meter.

3. Light scattering. A suspension of 250 mg clay/liter was prepared and the OD was measured and recorded by a Cary model 15 recording spectrophotometer in the wave length range 200 to 800 millimicron. From the data the average particle size was estimated following the method of Banin as set forth in the following References and is given as the average number of plates per tactoid.

The effective external surface area was estimated from the average tactoid size by the equation $$S_O = S_T/n$$

where $S_O$ and $S_T$ are the external and total specific surface area respectively, and $n$ is the average number of plates per tactoid.

4. Exchangeable Cations content. A sample of clay powder containing 0.1 – 0.5 meq. exchangeable cations, was leached 4 consecutive times with 20 ml aliquates of 1N CaCl$_2$ solution using the centrifuge method. The leachets were combined, completed to a volume of 100 ml in a volumetric flask and the ion concentration was determined using the appropriate analytical method as follows:

Lithium, Sodium — Flame Photometry

Calcium, Zinc, Copper, Cobolt, Iron — Atomic Absorption spectrophotometry.

Hydrogen, Aluminum — pH metric titration.

5. Replaceable Cations content. In the case of iron-clay, where not all of the adsorbed cations were exchangeable in 1N $CaCl_2$, a second series of four leachings was conducted on the clay sediment obtained after the $CaCl_2$ leachings. This was done with 0.5N HCL solution. The leachings were combined and iron content was determined as above.

REFERENCES

Banin, A. 1968, *Israel J. Chem.* 6, 27 – 36.

Banin, A. and Lahav, N., 1968, *Nature* 217, 1146 – 1147.

Banin, A. and Lahav, N., 1968, *Israel J. Chem.* 6, 235 – 250.

ABBREVIATIONS meq — milliequivalent
w/w — weight per weight
RCF — Relative Centrifugal Force (g)
N = normal
mho — reciprocal ohm, unit of electrical conductivity.
cm — centimeter
$m^2$ — square meters
mg — milligrams
gr — grams
g — grams
l — liters

What is claimed is:

1. A process for producing a cation clay, which process comprises:
   a. contacting a hydrogen clay in an aqueous slurry with an equivalent amount of a salt containing a cation to be exchanged in the presence of an anion-exchange resin in the hydroxide state, thereby exchanging quantitatively the cations of the salt for the adsorbed hydrogen of the clay; and
   b. recovering an acid-free, salt-free cation clay.

2. The process of claim 1 which includes preparing the aqueous slurry of the acid-free hydrogen clay, contacting the clay in the slurry with the anion-exchange resin, and adding to the slurry the equivalent amount of the salt.

3. The process of claim 1 wherein the cation is a monovalent metal, a divalent metal, a trivalent metal, and organic cation or mixtures thereof.

4. The process of claim 1 wherein the cation is sodium, potassium, lithium, cesium, ammonium, rubidium or mixtures thereof.

5. The process of claim 1 wherein the cation is magnesium, barium, calcium, zinc, copper, manganese, cobalt or mixtures thereof.

6. The process of claim 1 wherein the cation is iron, chromium, aluminum or mixtures thereof.

7. The process of claim 1 wherein the salt is a methyl ammonium compound or a carbodiimide.

8. The process of claim 1 wherein the salt is a chloride, bromide, sulfate, sulfite, acetate, phosphate, nitrate or mixtures thereof.

9. The process of claim 1 wherein the anion-exchange resin comprises quaternary ammonium active groups on a cross-linked polystyrene-divinylbenzene matrix.

10. The process of claim 2 wherein the salt is added to an aqueous slurry of the clay and resin when the pH of the slurry is from about 3.0 to 3.5.

11. The process of claim 1 wherein the hydrogen clay is contacted with the salt in the presence of the anion-exchange resin for a period of time of from about 5 to 60 minutes.

12. The process of claim 1 wherein the cation clay is recovered when the pH of the slurry is from about 5.5 to 7.5.

13. The process of claim 1 wherein the clay employed is selected from the group consisting of halloysite, illite, kaolinite, montmorillonite, polygorskite and unclassified clay of similar properties.

14. The process of claim 1 wherein the anion-exchange resin is introduced in bead form in a basket into the hydrogen clay slurry, and the slurry agitated, and while agitating, an equivalent amount of the salt is added to the slurry.

15. A process for producing an acid-free, salt-free, hydrogen-free cation-saturated clay, which process comprises:
   a. preparing an aqueous slurry of a hydrogen clay;
   b. contacting the hydrogen clay in the slurry with an equivalent amount of a water-soluble salt containing a metal cation to be exchanged, the contacting carried out in the presence of an anion-exchange resin in a hydroxide state to exchange quantitatively the cation of the salt for adsorbed hydrogen of the clay;
   c. separating the cation clay from the slurry when the pH of the solution is about 5.5 to 7.5; and
   d. recovering the cation clay.

16. A process for producing an acid-free, salt-free, cation-saturated clay, which process comprises:
   a. contacting a hydrogen clay selected from the group consisting of halloysite, illite, kaolinite, montmorillonite, polygorskite and unclassified clay of similar properties in an aqueous slurry, with an equivalent amount of a water-soluble salt containing a cation to be exchanged, wherein the salt is a chloride, bromide, sulfate, sulfite, acetate, phosphate, nitrate or mixtures thereof, and where the cation is sodium, potassium, lithium, cesium, ammonium, rubidium, magnesium, barium, calcium, zinc, copper, manganese, cobalt, iron, chromium, aluminum or mixtures thereof, the contacting carried out in the presence of an anion-exchange resin in the hydroxide state for a period of time of from about 5 to 60 minutes, thereby exchanging quantitatively the cations of the salt for the adsorbed hydrogen of the clay; and
   b. recovering from the slurry an acid-free, salt-free, cation-saturated clay when the pH of the slurry is from about 5.5 to 7.5.

* * * * *